US008650738B2

(12) United States Patent
Schulte

(10) Patent No.: US 8,650,738 B2
(45) Date of Patent: Feb. 18, 2014

(54) METHOD FOR INSERTING SPRINGS INTO A GROOVE

(76) Inventor: Guido Schulte, Rüthen-Meiste (DE)

( * ) Notice: Subject to any disclaimer, the term of this patent is extended or adjusted under 35 U.S.C. 154(b) by 375 days.

(21) Appl. No.: 13/000,249

(22) PCT Filed: Jun. 29, 2009

(86) PCT No.: PCT/IB2009/006829
§ 371 (c)(1),
(2), (4) Date: Dec. 20, 2010

(87) PCT Pub. No.: WO2010/001262
PCT Pub. Date: Jan. 7, 2010

(65) Prior Publication Data

US 2011/0094083 A1 Apr. 28, 2011

(30) Foreign Application Priority Data

Jun. 30, 2008 (DE) ......................... 10 2008 030 281

(51) Int. Cl.
*B23P 11/02* (2006.01)

(52) U.S. Cl.
USPC ................................................ 29/451; 29/467

(58) Field of Classification Search
USPC .................................................... 29/451, 467
See application file for complete search history.

(56) References Cited

U.S. PATENT DOCUMENTS

| | | | | |
|---|---|---|---|---|
| 7,562,431 | B2 * | 7/2009 | Lewark | 29/451 |
| 2005/0205161 | A1 * | 9/2005 | Lewark | 144/347 |
| 2008/0041008 | A1 | 2/2008 | Pervan | |
| 2010/0206435 | A1 * | 8/2010 | Symossek et al. | 144/344 |

FOREIGN PATENT DOCUMENTS

| | | |
|---|---|---|
| DE | 102004005047 | 10/2005 |
| DE | 102004015604 | 11/2005 |
| DE | 102004062648 | 7/2006 |
| EP | 1 674 223 A1 | 6/2006 |
| EP | 1 923 184 A1 | 5/2008 |
| WO | WO 2006/043893 | 4/2006 |
| WO | WO 2008/017301 | 2/2008 |

* cited by examiner

*Primary Examiner* — Carl Arbes
(74) *Attorney, Agent, or Firm* — Henry M. Feiereisen LLC

(57) ABSTRACT

The invention relates to a method for inserting a spring (3) into a longitudinal-side or head-side groove (4) of element panels (5) which can be laid in combination, wherein the element panels (5) can be locked together by means of a movement of the spring (3) relative to the element panels (5), having the following steps: a) providing springs (3) on a supply belt (6), wherein the springs (3) are releasably connected to the supply belt (6); b) detaching the springs (3) from the supply belt (6); c) moving the springs (3) into the groove (4) of a provided element panel (5).

9 Claims, 1 Drawing Sheet

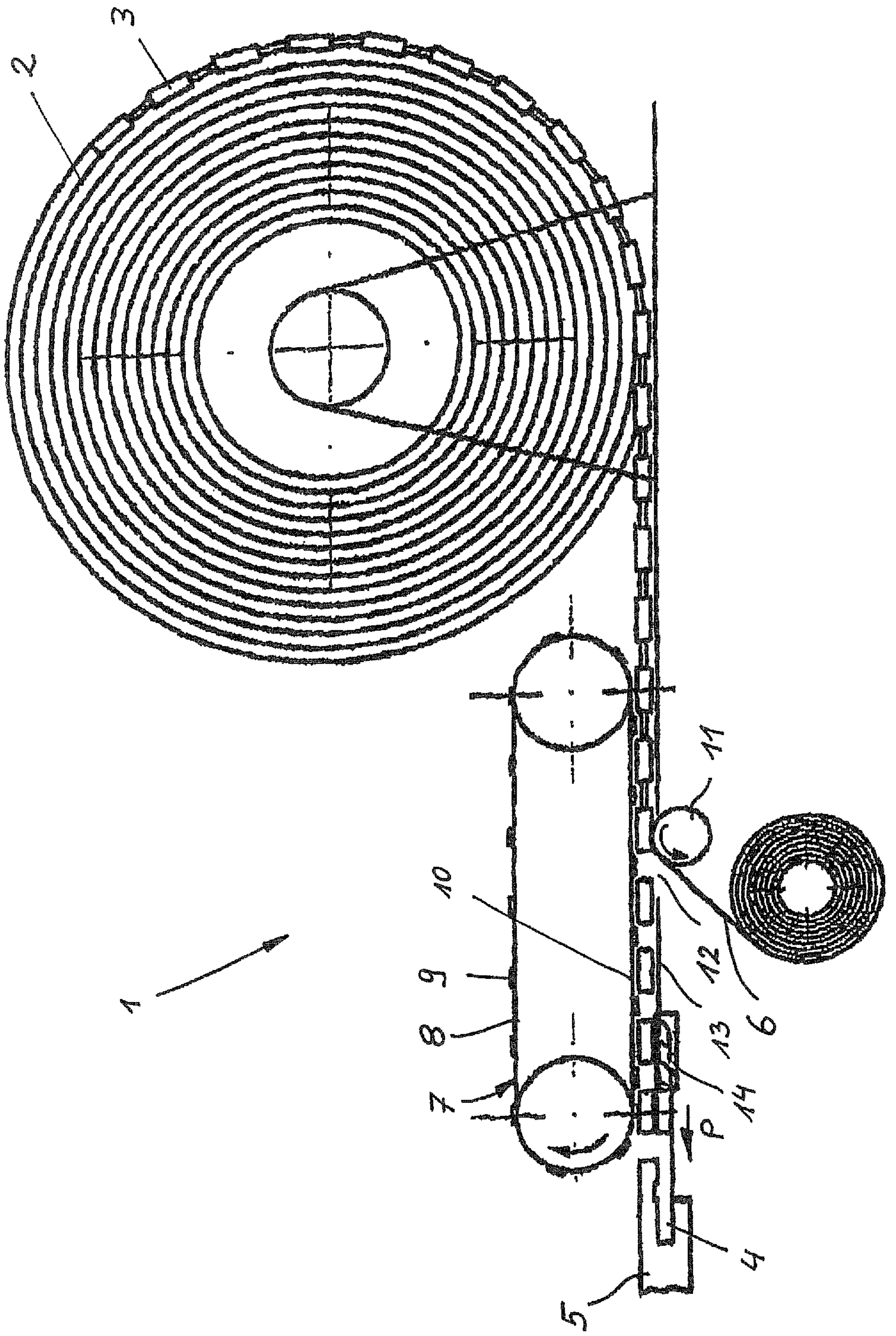
1
2
3
4
5
6
7
8
9
10
11
12
13
14
P

METHOD FOR INSERTING SPRINGS INTO A GROOVE

CROSS-REFERENCES TO RELATED APPLICATIONS

This application is the U.S. National Stage of International Application No. PCT/IB2009/006829, filed Jun. 29, 2009, which designated the United States and has been published as International Publication No. WO 2010/001262 and which claims the priority of German Patent Application, Serial No. 10 2008 030 281.3, filed Jun. 30, 2008, pursuant to 35 U.S.C. 119(a)-(d).

BACKGROUND OF THE INVENTION

The invention relates to a method for inserting a spring into a longitudinal-side or head-side groove of element panels and an apparatus for carrying out the method.

According to WO 2008/017301 A2, floor coverings made of a plurality of interconnected element panels, which have interlocking rails at their head sides and the longitudinal sides engaging in the installed position with adjacent element panels of a floor covering are known in the art. Grooves are provided in the head sides, wherein the grooves of two abutting head sides correspond with each other and form a locking channel for receiving a head spring. The head spring is preinstalled in the groove and protrudes over an end of the groove facing the longitudinal side of the element panel. At the same time, the head spring is in the preinstalled state completely housed inside the groove and can be moved at least partially from one groove into the corresponding groove of the adjacent element panel by displacing the protruding end of the head spring into the groove. Such covering composed of element plates has the advantage of obviating the need for subsequent insertion of the head springs into the locking channel. In this context, WO 2006/043893 A1 discloses the separation of springs from a contiguous arrangement of springs and insertion of the springs into the groove with an insertion device at the factory. The spring assemblies are produced by injection molding in form of a mat and separated in a separation unit. These separated springs should then be moved essentially parallel to their longitudinal or transverse direction and inserted into the groove, where they are held by friction forces, assuming a configuration where they can be bent about the longitudinal axis and are hence resiliently displaceable in the installation plane.

Separation of the springs requires a special separation unit in order to carefully remove the connecting pieces that connect two adjacent springs with each other. Because the springs are mass-produced components, relatively large quantities of plastic waste are generated from the connecting pieces where the springs are to be connected with the element panels. This waste must be discarded or recycled. Because this is a mass-produced article, a rapid supply of springs is desirable, so that there must be provisioned in a relatively large quantities. It is also possible to separate the springs individually and then, for example, orient them with a vibratory device so that a storage magazine can be filled; however, malfunctions can occur with components having a small volume. The springs should advantageously have a defined orientation before being inserted into the groove, should be provided in large quantities, without requiring a complex separation of interconnected springs.

DE 10 2004 005 047 B3 discloses another conventional method and device for inserting a strip which forms the spring of a panel. With this method, the panel and the locking element are transported parallel to each other at the same speed along a transport path in a transport device. During the transport, the locking element contacts stationary devices located on the side along the transport path, wherein the stationary devices become continuously narrower in the transport direction. This device displaces the locking element increasingly perpendicular to the transport direction, until starting with its front end, the locking element is continuously pushed farther into the groove of the panel (in relation to the transport direction).

DE 10 2004 062 648 B4 disclose a device for inserting springs into the head sides and/or longitudinal sides of technical products, wherein springs are stored for a transfer arrangement in order to later insert the springs with a pressing device into the wood products. For example, when the springs arrive from storage, the springs may be cut to the desired length either before or in the transfer device and transported to a pressing device which is movable transversely to the transport direction of the technical wood products.

It is an object of the invention to disclose an apparatus for inserting springs into a groove, which obviates or advantageously solves the aforementioned disadvantages.

SUMMARY OF THE INVENTION

The method of the invention for inserting a spring into a longitudinal-side or head-side groove of interconnected elements includes supplying springs on a supply belt, wherein the springs are releasably connected with the supply belt. Before the springs can be inserted into the groove, they should be detached from the supply belt and subsequently moved by an insertion unit into the groove of a provided element panel.

The springs are arranged on a supply belt such that the springs are not directly materially connected with each other, and are instead coupled with one another only by way of the supply belt. The springs are arranged on the supply belt with a predetermined mutual spacing. Using the supply belt has the advantage that the springs can be provided in large quantities on very long supply belts, for example in form of wound coils, and very precisely positioned, so that the springs which were already separated ahead of time can be quickly and precisely supplied to an insertion unit. No small-volume plastic waste is produced at the apparatus for inserting the springs. Machining of the springs by separating connecting pieces is eliminated. The employed supply belt can be reused.

In the context of the invention, a supply belt is particularly a belt made out of a plastic material. It is fundamentally possible to provide several supply belts running in parallel, to which the spring is connected. It is important that the springs are not directly connected with each other, meaning that they are already separated, but at the same time have a defined orientation with which they can be supplied to the insertion unit.

The springs can be connected to the supply belt across their entire surface area or only at certain regions/points. Essential is that the springs are securely attached at their respective positions and that they can be easily detached from the supply belt. The releasable connection of the springs can also be attained by adhesive bonding over their entire surface area or only point-wise, wherein the employed adhesive allows release of the springs from the supply belt. The supply belt may be flat. However, the supply belt may also be contoured, meaning not flat. The contour may be formed by raised and recessed portions having an arrangement and shape that match the geometry of the springs.

When using profiled supply belts, the springs can also be releasably attached on the supply belts with clamps. The springs form with this type of attachment a positive lock with the supply belts. However, in the context of the invention, a combination of positive and adhesive attachments is not excluded.

Advantageously, the smallest possible amount of adhesive should be used, wherein the springs are inserted into the groove substantially free of adhering adhesive. Optionally, a stripper can be used for this purpose.

The springs may be made of wood, metal, plastic or composite materials such as, for example, wood-plastic mixtures or fiber composites. Depending on the base material and the geometry, the springs may be produced by injection molding or extrusion. With two-dimensional base materials, contour extraction or punching may be used. The parts may therefore be punched parts or injection molded parts. The springs may be constructed to be stiff or elastic. They can be formed as one part or several parts.

The supply belt may be perforated or have registration marks to allow flawless guiding, just as with a toothed belt.

For removing the springs from the supply belt, the springs are transferred to a transport rail, via which they reach the insertion unit which finally inserts the springs into the grooves. The transport rail replaces the supply belt as support for the springs and hence has the same orientation as a supply belt. The supply belt can be diverted with a groove in the transport rail, wherein the springs slide across the groove and are transported onward towards the insertion unit. The springs can be transported either by applying tension to the supply belt or by a belt conveyor which grasps the spring and displaces the springs towards the transport rail. A belt conveyor is to be understood as a positive or frictional enveloping drive having catches which engage with the springs and transport the springs. The belt conveyor may also be a chain drive or a flat belt drive, wherein in view of the size of the springs primarily a flat belt drive is employed. The flat belt drive is provided as a drive unit which advances the springs to the insertion unit in the transport direction. The catches are preferably arranged so that they not only engage on springs, but between adjacent springs, which for this purpose are arranged with a predetermined mutual spacing. In this way, a spring is always arranged between each two consecutive catches, wherein the spring is supplied by the belt conveyor to the insertion unit at a defined speed. In addition to the drive of the belt conveyor, the supply belt can also be pulled, in particular when the supply belt is wound. The supply belt must then be pulled at a speed that is synchronized with the speed of the belt conveyor.

The apparatus of the invention for carrying out the method includes means for making available an element panel to be provided with a spring and a storage unit for receiving the supply belt with adhesively attached springs. This storage unit is particularly a magazine store the several coils. It would fundamentally also be possible to arrange the supply belt in loops and to convey the supply belt in this form to the device of the invention. The apparatus includes also a belt conveyor which is in contact with the springs releasably arranged on the supply belt, and which in particular positively grasps the springs. Also required is a slide rail for transporting the springs detached from the supply belt as well as an insertion unit adapted to insert the springs into a groove of the element panels. The entire arrangement operates at high speed, so that corresponding electric drives and control means with the required actuating assemblies and sensor assemblies is assumed to be present. This is an automatic method by which springs of different designs can be inserted into correspondingly formed grooves.

The springs are particularly head springs as described in WO 2008/017301 A2, i.e., they can be moved from one groove into an adjacent groove via inclined surfaces, bends or buckling, wherein the springs are frictionally held inside the grooves into which they were inserted before connection of two element panels. These are particularly springs which project over a longitudinal side of the element panel and which can be moved partially for one groove into the corresponding groove of the adjacent element panel by displacing the projecting or protruding end.

BRIEF DESCRIPTION OF THE DRAWING

The invention will now be described in more detail with reference to the exemplary embodiment illustrated in the drawing.

FIG. 1 shows a simplified schematic diagram of the apparatus according to the invention.

DETAILED DESCRIPTION OF PREFERRED EMBODIMENTS

An apparatus 1 is shown in a simplified schematic diagram, with which springs 3 wound on a coil 2 can be inserted into a groove 4 of an element panel 5 to be laid down in an interlocking arrangement.

This apparatus 1 is used for processing springs 3 which are releasably connected with a supply belt 6, in particular by adhesive bonding. The springs 3 are detached from the supply belt 6 in the apparatus 1. After the springs 3 have been detached, the supply belt 6 is wound up and can once more be provisioned with springs 3.

The springs 3 are attached on the supply belt 6 with a constant spacing and are transported in the apparatus in the plane of the figure from right to left. The springs 3 are transported onward via a belt conveyor 7 having a flat transport belt 8 provided with catches 9. The catches 9 are arranged with the same spacing as the springs 3 on the supply belt 6, so that a catch 9 always engages between two springs 3. The lower belt section 10 of the transport belt 8 is located on the side of the springs 3 facing away from the supply belt 6. A deflection roller 11 is located approximately at the center of the lower belt section 10, followed by a groove 12, through which the supply belt 6 is pulled away downwardly and wound up. At the same time, the lower belt section 10 of the belt conveyor 7 is in positive engagement with the springs 3, so that the springs 3 are transported across the deflection roller 11 and the groove 12 onto a transport rail 13 which leads to an insertion unit 14.

The springs 3 are individually inserted into the groove 4 of a respective element panel 5 through linear displacement of the insertion unit 14 in the direction of the arrow P. In a manner not described in detail, after insertion of the spring 3 an additional element panel 5 is positioned opposite the insertion unit, whereby the aforedescribed process is repeated and the next element plate 5 can be provided with a spring 3.

The invention claimed is:

1. A method for inserting a spring into a longitudinal-side or head-side groove of element panels constructed to be installed in an interlocked fashion through movement of the spring relative to the element panels, comprising the steps of:

a) providing springs on a supply belt, wherein the springs are releasably attached to the supply belt;

b) detaching the springs from the supply belt; and c) moving the springs into the groove of an element panel.

2. The method of claim 1, wherein the springs are releasably attached to the supply belt at least in regions by adhesive bonding.

3. The method of claim 1, wherein the springs are releasably attached to the supply belt at least in regions by clamping.

4. The method of claim 1, wherein the supply belt with the springs is provided as a wound coil.

5. The method of claim 1, wherein moving the springs into the groove further comprises the steps of:

transferring the springs from the supply belt to a belt conveyor;

transferring the springs from the belt conveyor to a transport rail; and delivering the springs via the transport rail to an insertion unit for insertion into the groove.

6. The method of claim 5, wherein the belt conveyor has catches arranged on a transport band, with the catches grasping the springs and moving the springs towards the transport rail.

7. The method of claim 5, wherein the supply belt is carried along by the belt conveyor by way of the adhesively bonded springs.

8. The method of claim 5, wherein the supply belt is pulled at a speed that is synchronized with a speed of the belt conveyor.

9. The method of claim 1, wherein the springs are free from adhering adhesive when inserted into the groove of the element panel.

* * * * *